Aug. 1, 1933. A. L. KRONQUET 1,920,869
MACHINE FOR APPLYING FRICTION COVERS TO CONTAINERS
Filed Dec. 16, 1929 6 Sheets-Sheet 4
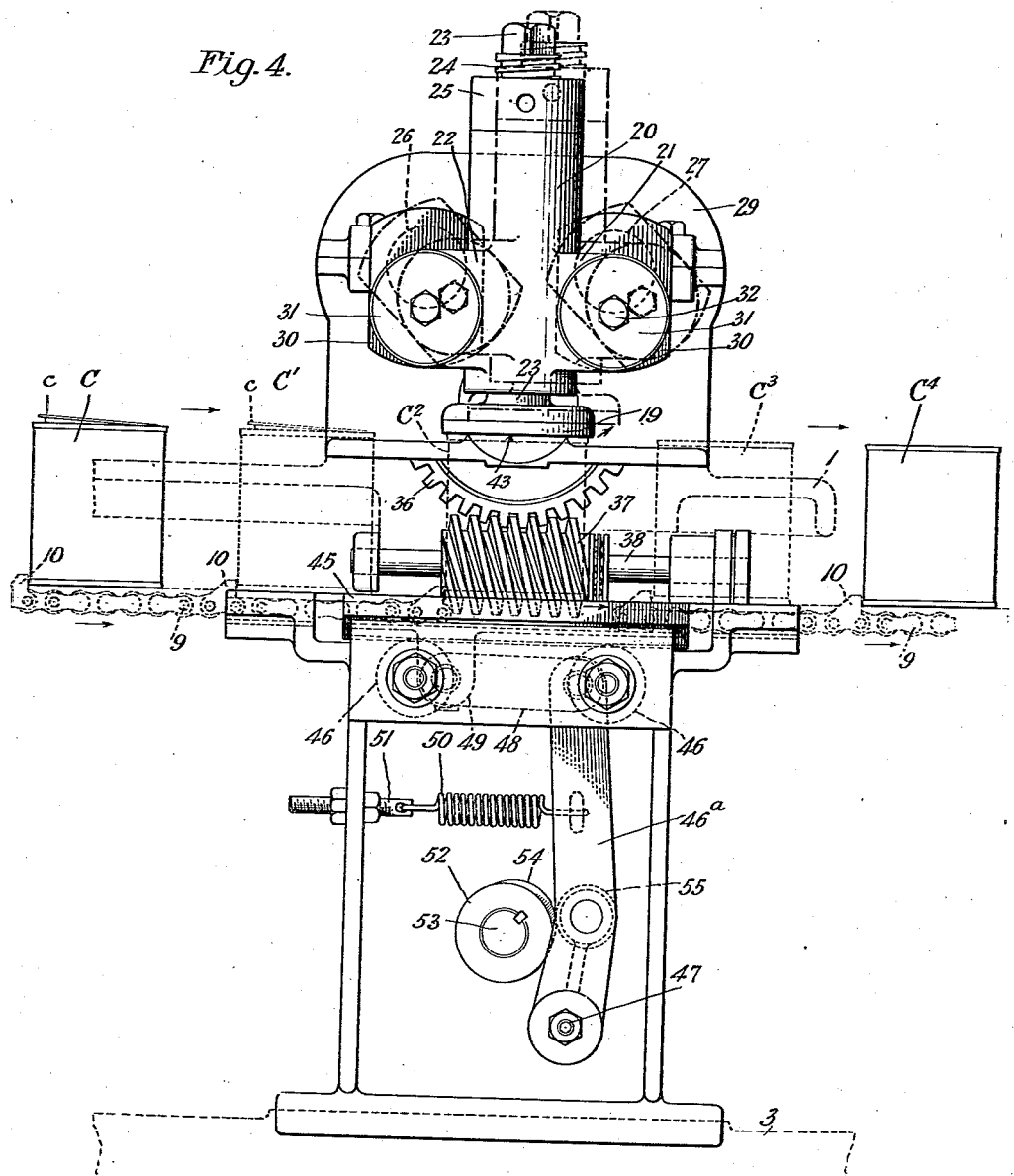
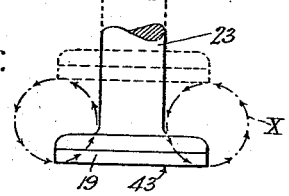

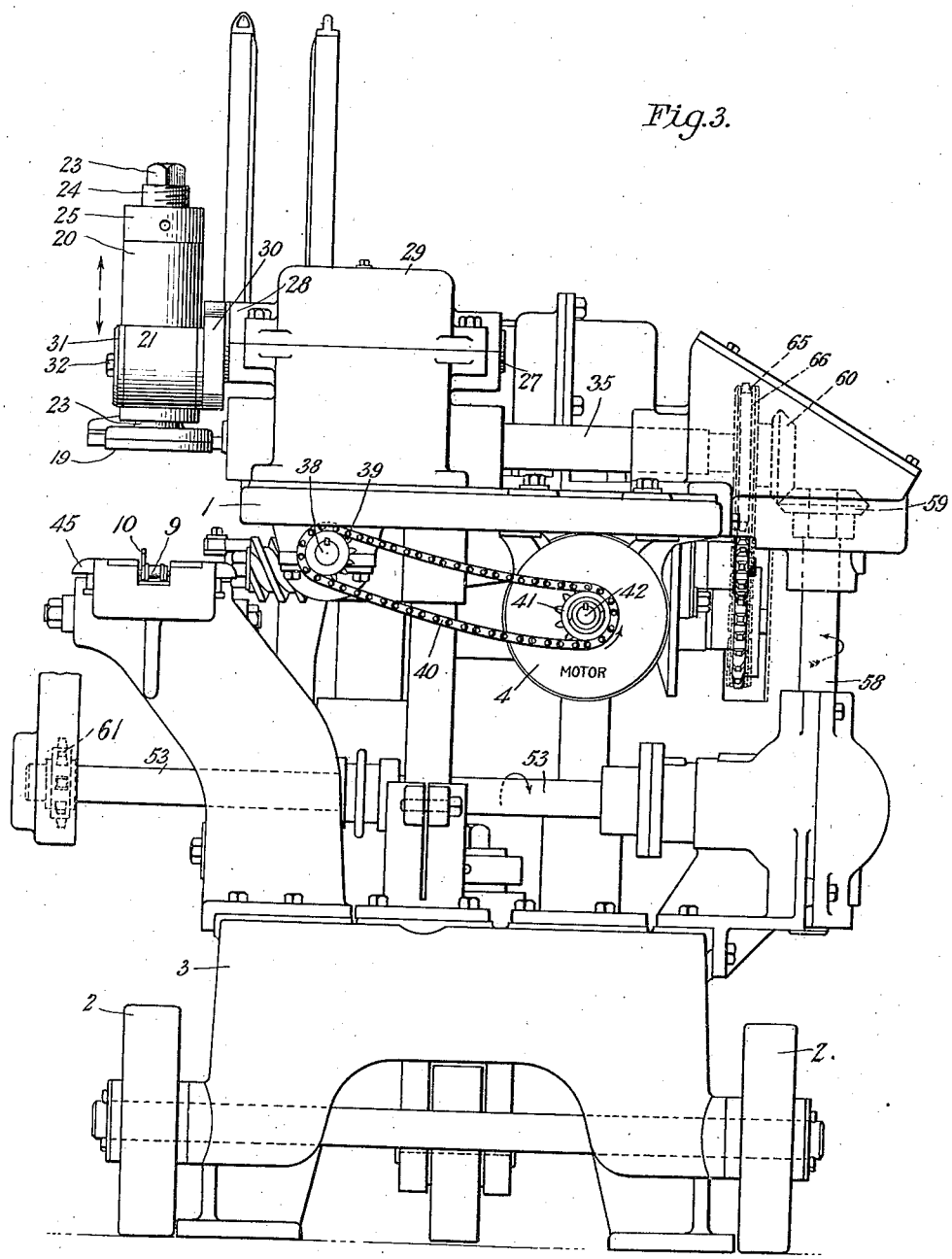

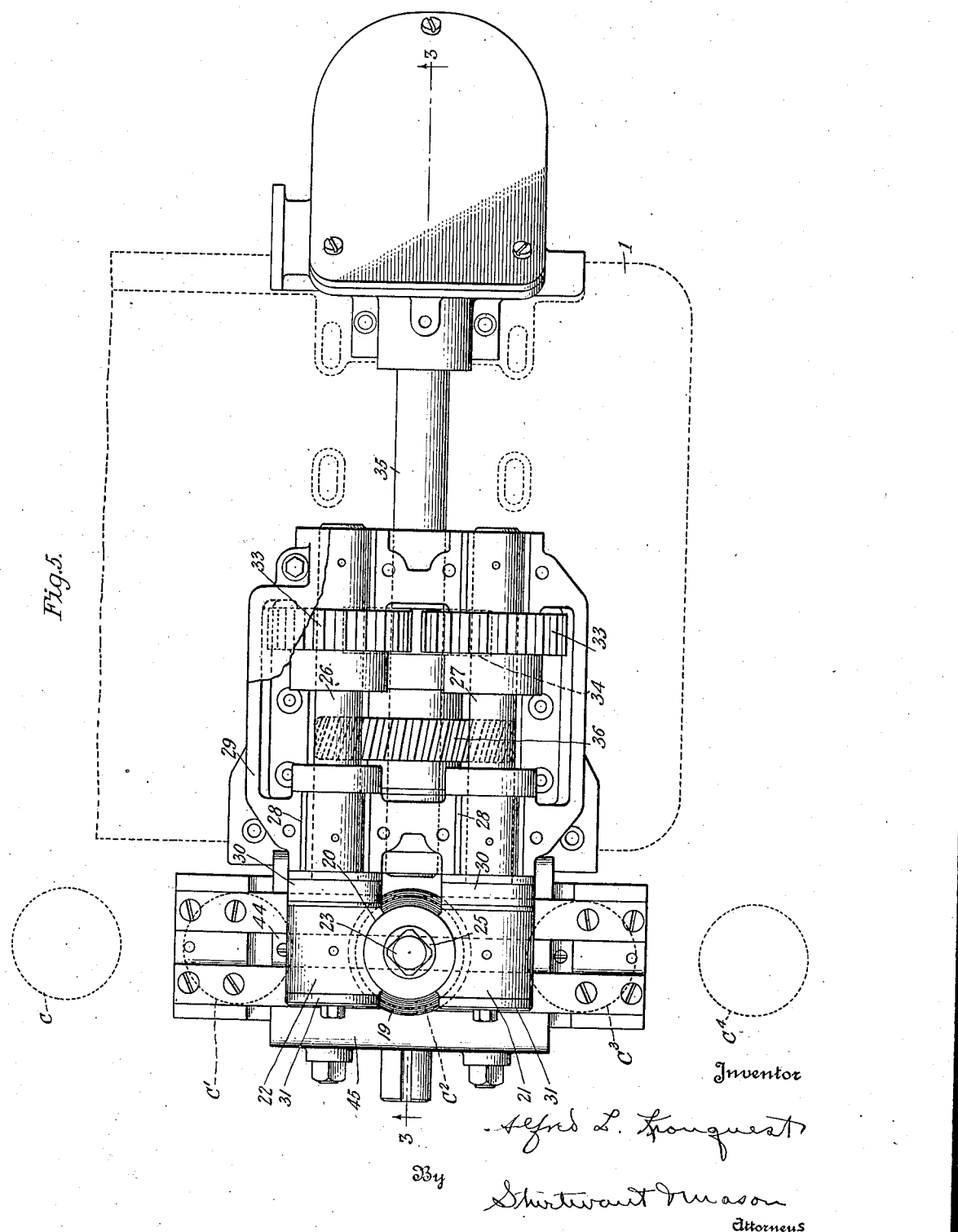

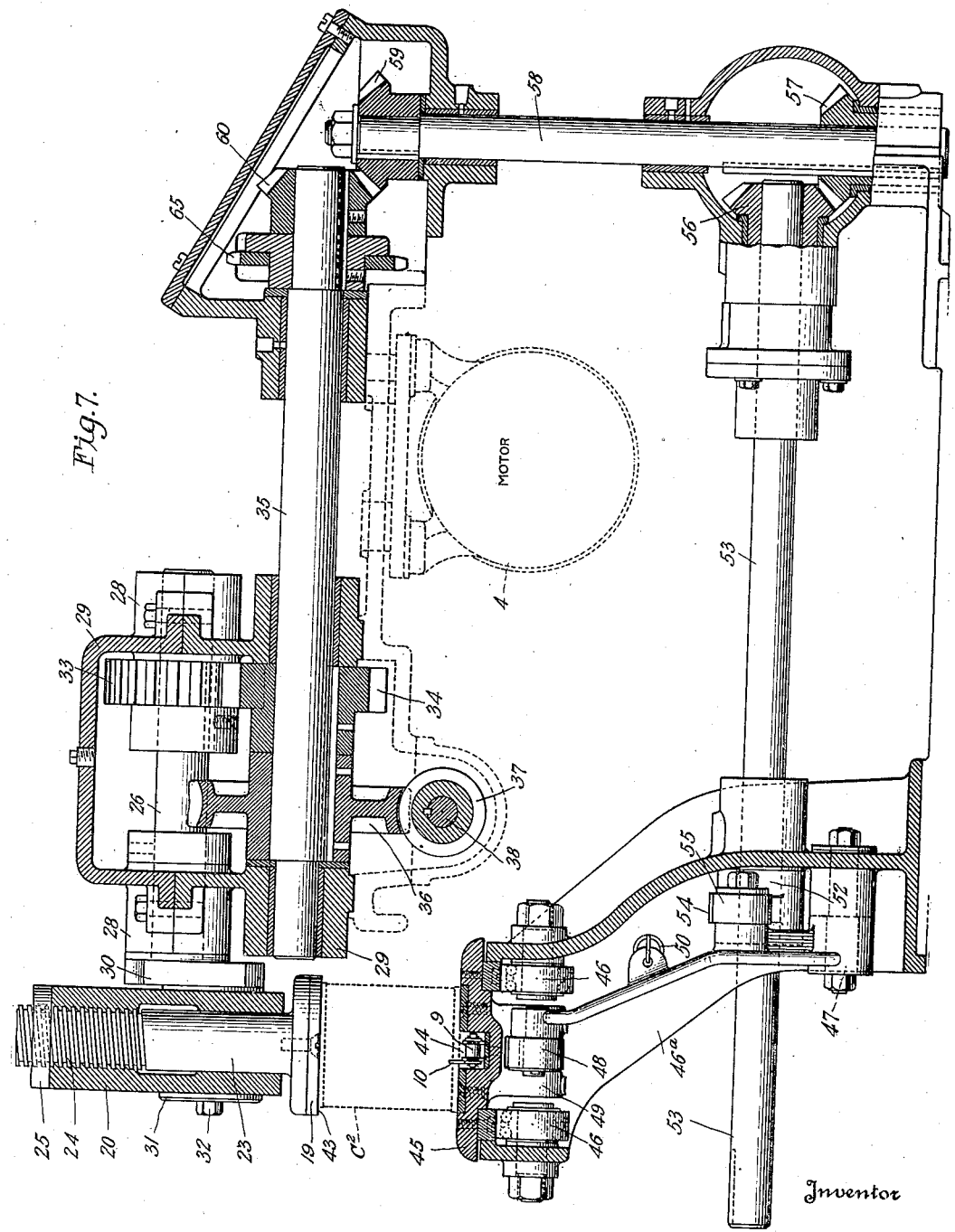

Patented Aug. 1, 1933

1,920,869

UNITED STATES PATENT OFFICE 1,920,869

MACHINE FOR APPLYING FRICTION COVERS TO CONTAINERS

Alfred L. Kronquest, Syracuse, N. Y., assignor to Continental Can Company, Inc., New York, N. Y., a Corporation of New York Application December 16, 1929. Serial No. 414,473

3 Claims. (Cl. 113—14)

The invention relates to new and useful improvements in a machine for applying friction covers to containers.

An object of the invention is to provide a machine wherein the container after it is filled has a cover applied thereto, which cover is firmly forced onto the friction seat therefor, while the container is moving in a straight line.

A further object of the invention is to provide a machine of the above type wherein the support for the container travels with the container during the forcing of the cover onto the friction seat.

A further object of the invention is to provide a machine of the above type wherein the cover is forced onto the friction seat of the container by means of a traveling head which moves bodily in a circular path and is maintained during its bodily travel in a vertical position with the face thereof which engages the cover horizontal.

A further object of the invention is to provide a machine of the above type with means for marking a cover and for placing the same on a container when there is a container to be closed.

A further object of the invention is to provide a machine of the above type wherein the filled containers are fed to the machine at random and are spaced and delivered to the closing mechanism in timing with the movement of the closing mechanism.

These and other objects will in part be obvious and will in part be hereinafter more fully disclosed.

In the drawings which show by way of illustration one embodiment of the invention:—

Fig. 3 is an end view of the machine.

Fig. 4 is a front view on an enlarged scale showing the movable support for the containers and the closing head for forcibly applying the covers to the containers.

Fig. 5 is a plan view of the closing head with parts broken away to show the operating devices therefor.

Fig. 6 is a view showing diagrammatically the path of travel of the closing head.

Fig. 7 is a sectional view on the line 7—7 of Fig. 2.

Figure 1:
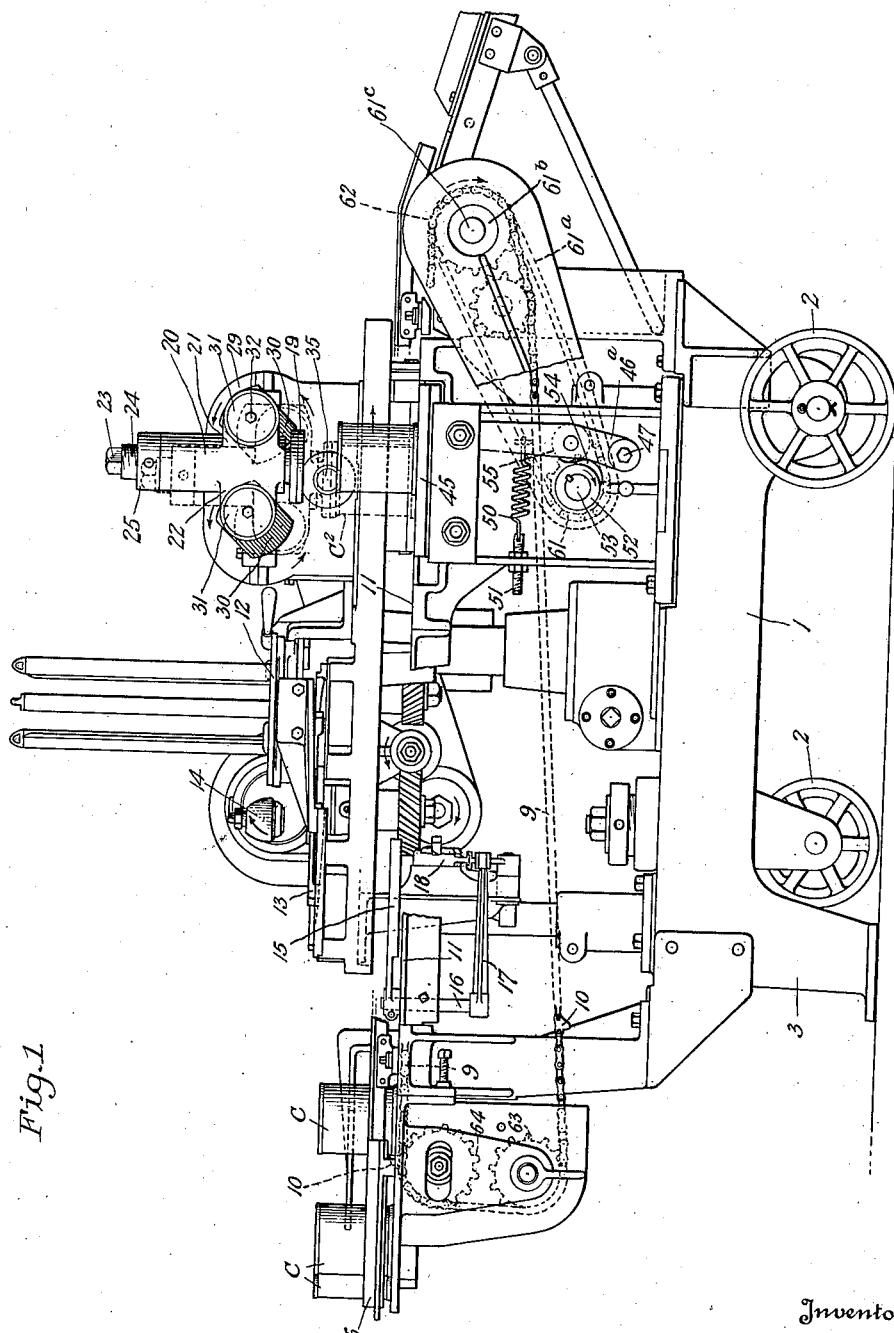
Figure 1 is a front view of a machine embodying the improvements.
Figure 2:
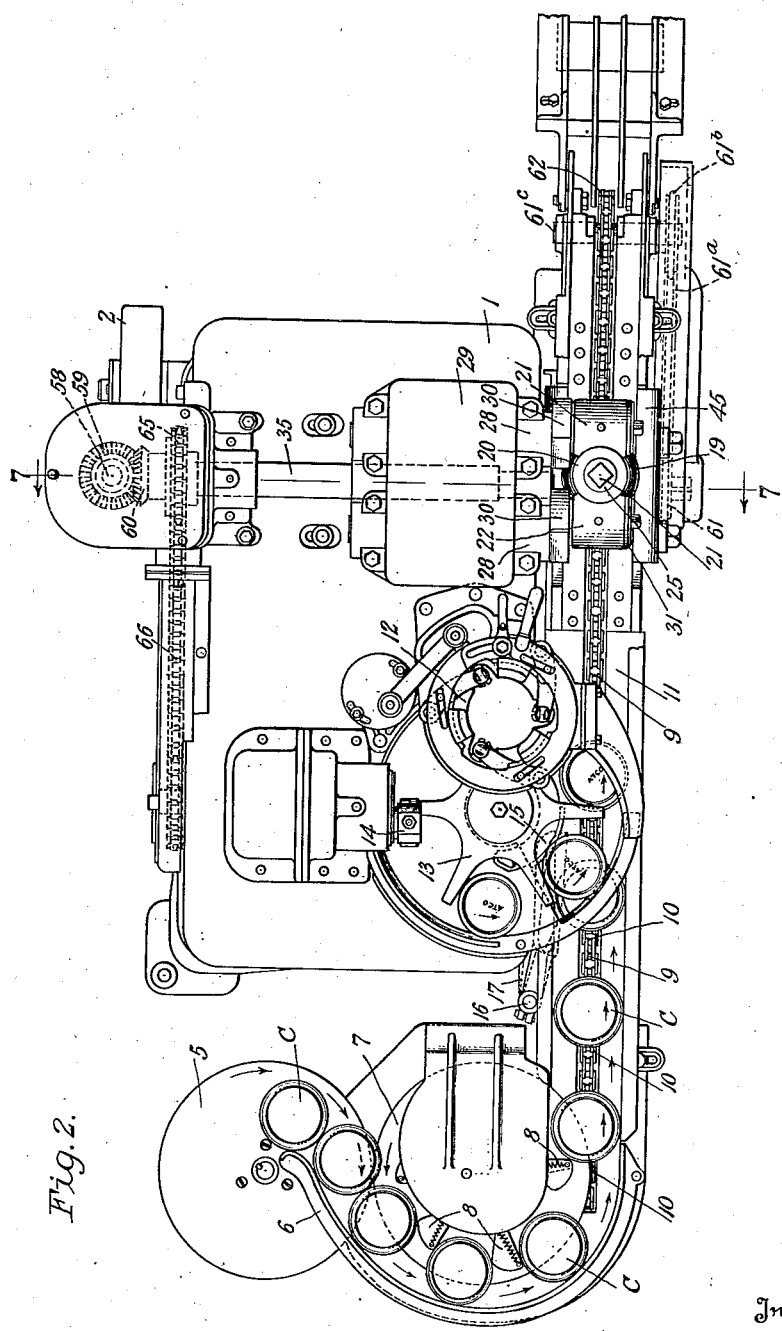
Fig. 2 is a plan view of the same.

The invention is directed to a machine for applying friction covers to container bodies. The cover is applied by forcing the same onto a friction seat formed on the container body. The containers are received at random and by a timing mechanism are spaced and delivered to the closing mechanism in a predetermined order. Covers are supplied from a stack and are passed through a marking device which impresses an identifying mark in the metal of the container and the cover is then placed loosely on the container. Means is provided so that if there is no container to be closed, no cover is released from the stack.

The containers with the covers loosely applied thereto are fed in a straight line through the closing mechanism. Said closing mechanism includes a traveling head which is adjustably mounted on a cross head which in turn is mounted on two cranks rotating so as to move the closing head bodily in a circular path while maintaining said cross head always in vertical position with its under face which engages the cover horizontally.

The container as it passes beneath this closing head moves onto a supporting table which is timed so as to travel with the closing head. The container does not stop but is closed while it is traveling.

After the cover has been forcibly seated in the container, it is removed from the traveling support and delivered from the machine while the traveling support moves rearwardly and is positioned to receive the next container.

Referring more in detail to the drawings, the closing machine includes a main frame 1 which is shown as mounted in part on wheels 2, 2 and in part on a standard 3 which provides a means whereby the machine may be readily moved about the plant. Mounted on the main frame 1 is a motor 4 which operates the entire machine. The containers are received onto a disc 5 at random. The containers are indicated at C. This disc turning in the direction of the arrow through suitable driving connections with the motor discharges the containers against a guide rail 6 and this guide rail together with the movement of the disc 5 places the containers on a rotating support 7. Associated with this rotating support 7 are timing fingers 8.

The timing mechanism forms no part of the present invention per se, but is shown, described and claimed in the application of Mathew M. Sedwick, Serial No. 414,431, filed of even date herewith. These timing fingers select one container at a time and space the containers and deliver the same to a traveling conveyor 9. The traveling conveyor 9 is provided with spaced lugs 10 which receive the containers delivered thereto by the timing fingers.

The containers are moved by the conveyor 9 in a straight line along the supporting table 11. The covers for the containers are placed in a stack holder 12 and are released one at a time from the stack holder onto a support beneath the stack holder and are conveyed by a rotating turret 13 beneath a marker 14 and are thence placed by this rotating turret on top of a traveling container.

Extending alongside of the path of travel of the conveyor 9 is an arm 15 connected to a vertical shaft 16 which in turn carries an arm 17 and this arm 17 operates through a suitable clutch mechanism 18 so that when a container passes the arm and throws into action the cover feeding mechanism for supplying a cover for the container, if there is no container passing the arm, then the cover feed is inactive. This cover feed which includes means whereby the stack holder may be readily adjusted for covers of different sizes forms no part of the present invention per se but is shown, described and claimed in the application of George Flook, Serial No. 414,474, filed of even date herewith.

The marker for marking the covers includes a traveling marking head which remains in a vertical position during its entire movement and the marking head can, therefore, move down into a recess in a cover and impress an identifying mark in the bottom wall of the recess. One of the common forms of friction closed containers includes a container having a top portion provided with a friction seat and the cover has a central depression forming a friction plug which is forced onto said friction seat. This type of container is so well known in the art that further description thereof is not thought necessary.

The marker is so constructed and operated as to impress an identifying mark in the bottom wall of this depression forming the friction plug, as has already been noted. This marker forms no part of the present invention per se, but is shown, described and claimed in the application of Mathew M. Sedwick, Serial No. 414,430, filed of even date herewith.

The containers with the covers placed lightly thereon are delivered beneath a closing head 19. The closing head 19 is mounted in a cross head 20. Said cross head is in the form of a sleeve having laterally projecting portions 21 and 22. The closing head 19 is carried by a stem 23 which is mounted in this sleeve 20 and is firmly locked in adjusted positions therein. Said stem has the upper portion thereof threaded at 24 and the sleeve is threaded to receive this threaded portion of the stem. The locking collar 25 mounted on the stem can be turned down against the end of the sleeve for holding the stem in set positions. The upper end of the stem is slabbed so as to receive a wrench for the adjustment of the head in the sleeve. The closing head is mounted on two shafts 26 and 27. These shafts are in turn mounted in suitable bearings 28, 28 carried by the upper frame member 29 of the machine.

Each shaft is provided with a crank 30 and on the outer end of the crank is a cylindrical projecting stud which engages the laterally projecting portions 21 and 22 respectively. The sleeve is maintained on the cranks by washers or plates 31 which are attached to the cranks by means of bolts 32. These washers or plates overlie the projecting portions 21 and 22, and thus prevent the head from endwise movement on the studs carried by the cranks.

Each shaft is provided with a gear 33, and these gears 33 mesh with a gear 34 carried by a shaft 35 which in turn is mounted in suitable bearings in the upper frame structure 29. A spiral gear 36 carried by the shaft 35 meshes with a worm gear 37 carried by a cross shaft 38 which in turn is mounted in suitable bearings in the upper frame structure 29. The shaft 38 carries a sprocket wheel 39 on its outer end (see Fig. 3). A sprocket chain 40 runs over the sprocket wheel 39 and also over a sprocket wheel 41 on the shaft 42 of the motor 4. Thus it is that the shafts 26 and 27 are rotated and this causes the head to travel bodily in a circular path, as shown in Fig. 6, where the path of movement of the head is indicated at X. The under face of the head 19 is horizontal as indicated at 43 in Fig. 6.

The head as it travels is maintained in a vertical position and the under face 43 will always be in a horizontal position. Thus it is that the head can move down onto the cover when loosely applied to a traveling container and force the cover down onto the friction seat on the container body.

The conveyor 9 travels through a channel 44 formed in a support or table 45. This support or table 45 is mounted on rollers 46, 46 and is adapted to travel back and forth in a horizontal plane beneath the closing head 19. The container C is shown with the cover c loosely applied thereto. In the dotted line position C' it is moved onto the support or table 45 and is shown in full line position $C^2$ beneath the closing head. The closing head is pressing the cover onto the friction seat and the support or table is moving with the container so that when the head is engaging the cover and forcing it onto the seat, the container and supporting table therefor are both moving. This prevents any possible tilting or cramping of the parts and enables the cover to be forced directly down onto its seat. The container indicated at the position $C^2$ in Fig. 4 has the cover firmly seated thereon and the head is about to move away from the cover. The table is still moving in a forward direction. The container is moved off from the table onto the stationary supporting member therefor to the position shown at $C^3$ and then into the position shown at $C^4$ and finally delivered from the machine. The table is moved back and forth by means of a lever 46a. Said lever is pivoted at 47 and is connected by means of a link 48 to a lug 49 depending from the table. A spring 50 engaging the lever 46a and an adjustable anchoring bolt 51 normally move the table to the left. The table is forced to the right by means of a rotating cam member 52 carried by a shaft 53. The cam carried by the member 52 is indicated at 54.

A roller 55 carried by the lever engages this member 52. As the projecting cam portion 54 comes into engagement with the roller, it will move the upper end of the lever to the right, as viewed in Fig. 4, and this positively moves the table in the direction of the arrow. This projecting cam portion 54 is so shaped and timed as to move the container at substantially the same speed as the traveling head 19 at the time when the cover is being forced onto the friction seat on the container.

The shaft 53 is mounted in suitable bearings in the frame 1 and carries a bevel gear 56 at its inner end. This bevel gear 56 meshes with a bevel gear 57 on a vertical shaft 58. The vertical shaft 58 carries a bevel gear 59 at its upper end which meshes with a bevel gear 60 on the shaft 35. The shaft 35, therefore, through the shaft 58 imparts rotation to the shaft 53.

On the end of the shaft 53 is a sprocket wheel 61. A sprocket chain 61a running over this sprocket wheel engages a sprocket wheel 61b on the shaft 61c. The shaft 61c carries a sprocket wheel 62. The conveyor 9 runs over sprocket wheels 62, 63 and 64. The shaft 35 carries a sprocket wheel 65 and a sprocket chain 66 running over this sprocket wheel 65 engages a sprocket wheel on the actuating shaft which imparts motion to the marker, cover feed and the cover feeding turret.

The clutch controlled by the arm 15 is carried by this actuating shaft, and it is through the controlled clutch that the cover feed and marker are operated.

From the above it will be apparent that a machine has been provided wherein filled containers may be received at random, the covers applied thereto and said containers and assembled covers fed to a closing mechanism in spaced relation and in timing with the operation of the closing mechanism. The container is moved onto a table and as the head engages the cover for pressing it onto the friction seat on the container body, the table moves with the head and after the container has been thus closed, it is taken from the table by the traveling conveyor and discharged from the machine. At the same time, the table returns to receive the next container and the traveling head follows its circular path of movement and comes into engagement with the next cover and seats the same in the container body. The containers are received at random and are timed and directed to the closing mechanism in a straight path of travel so that there is little or no spill incident to the movement of the container beneath the closing head, and furthermore, the movement of the container in a right line with the traveling head moving in a plane containing said right line movement of the container brings about a very easy and perfect seating of the cover in the container.

It will be understood that other types of friction closures may be closed on the machine embodying the improvements without departing from the spirit of the invention. It will also be understood that various changes in the details of construction and the arrangement of the parts may be made without departing from the spirit of the invention as set forth in the appended claims.

Having fully described my invention, what I claim as new and desire to secure by Letters Patent, is:—

1. A machine for applying friction covers to containers comprising conveying means for feeding the containers in a straight line, means for loosely applying a friction plug closure to the container while it is traveling, a closing head for seating the cover in the container while it is traveling including a supporting stem, a head carried thereby, a sleeve in which said stem is mounted for vertical adjustment, said sleeve having laterally projecting portions, two parallel shafts having their axes in a horizontal plane and at right angles to the path of travel of the container, cranks carried by the shaft and engaging the laterally projecting portions of the sleeve for supporting and moving the sleeve bodily while maintained in a vertical position so that said head is caused to engage and travel with the container while seating the cover thereon, and means traveling with the container for supporting the same while the cover is being seated.

2. A machine for applying friction covers to containers comprising conveying means for feeding the containers in a straight line, means for loosely applying a friction plug closure to the container while it is traveling, a closing head for seating the cover in the container while it is traveling including a supporting stem, a head carried thereby, a sleeve in which said stem is mounted for vertical adjustment, said sleeve having laterally projecting portions, two parallel shafts having their axes in a horizontal plane and at right angles to the path of travel of the container, cranks carried by the shaft and engaging the laterally projecting portions of the sleeve for supporting and moving the sleeve bodily while maintained in a vertical position so that said head is caused to engage and travel with the container while seating the cover thereon, a traveling support on which the container rests while the cover is being seated, a lever attached to said support, a cam engaging said lever for positively moving the support in a forward direction while the cover is being seated, and a spring for returning said support to receive another container while the closing head is on an idle movement.

3. A machine for applying friction covers to containers comprising conveying means for feeding the containers in a straight line, means for loosely applying a friction plug closure to the container while it is traveling, a closing head for seating the cover in the container while it is traveling including a supporting stem, a head carried thereby, a sleeve in which said stem is mounted for vertical adjustment, said sleeve having laterally projecting portions, two parallel shafts having their axes in a horizontal plane and at right angles to the path of travel of the container, cranks carried by the shaft and engaging the laterally projecting portions of the sleeve for supporting and moving the sleeve bodily while maintained in a vertical position so that said head is caused to engage and travel with the container while seating the cover thereon, a traveling support on which the container rests while the cover is being seated, a lever attached to said support, a cam engaging said lever for positively moving the support in a forward direction while the cover is being seated, and a spring for returning said support to receive another container while the closing head is on an idle movement, said support for the container having a recess in its upper face and extending lengthwise thereof, and said conveying means for the container being movable through said recess for moving the containers onto and off from said support.

ALFRED L. KRONQUEST.